(12) United States Patent
Jones-McFadden

(10) Patent No.: US 9,723,485 B2
(45) Date of Patent: Aug. 1, 2017

(54) SYSTEM FOR AUTHORIZING ACCESS BASED ON AUTHENTICATION VIA SEPARATE CHANNEL

(71) Applicant: BANK OF AMERICA CORPORATION, Charlotte, NC (US)

(72) Inventor: Alicia C. Jones-McFadden, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 10 days.

(21) Appl. No.: 14/987,317

(22) Filed: Jan. 4, 2016

(65) Prior Publication Data

US 2017/0195879 A1 Jul. 6, 2017

(51) Int. Cl.
*H04M 1/66* (2006.01)
*H04W 12/06* (2009.01)

(52) U.S. Cl.
CPC .................................. *H04W 12/06* (2013.01)

(58) Field of Classification Search
CPC ..... H04W 12/02; H04W 12/06; H04W 12/08; H04W 12/12
USPC .................................................. 455/411, 410
See application file for complete search history.

(56) References Cited

U.S. PATENT DOCUMENTS

| | | | |
|---|---|---|---|
| 7,071,113 B2 | 7/2006 | Kim et al. | |
| 7,600,676 B1 | 10/2009 | Rados et al. | |
| 7,707,120 B2 | 4/2010 | Dominguez et al. | |
| 7,769,991 B2 | 8/2010 | Niemelä | |
| 7,899,753 B1 | 3/2011 | Everhart | |
| 8,087,085 B2 | 12/2011 | Hu et al. | |
| 8,195,576 B1 | 6/2012 | Grigg et al. | |
| 8,312,545 B2 | 11/2012 | Tuvell et al. | |
| 8,341,749 B2 | 12/2012 | Rogel | |
| 8,346,666 B2 | 1/2013 | Lindelsee et al. | |
| 8,355,982 B2 | 1/2013 | Hazel et al. | |
| 8,380,177 B2 | 2/2013 | Laracey | |

(Continued)

FOREIGN PATENT DOCUMENTS

GB 401015 11/1933

OTHER PUBLICATIONS

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

*Primary Examiner* — Temica M Beamer
(74) *Attorney, Agent, or Firm* — Michael A. Springs; Moore & Van Allen PLLC; Nicholas C. Russell

(57) ABSTRACT

Embodiments of the invention are directed to a system, method, or computer program product for authorizing access based on authentication via a separate channel. In this way, the invention generates and utilizes tokenized identification of user authentication into third party systems to confirm the user identification and subsequently allow authentication into an application based on receipt of the token. As such, the system creates a three way communication linkage for resource transfer which leverages the user's authentication via the merchant system. The system positions a generated token with a merchant. Once a user is identified as authenticated into a merchant system, geo-location, or other application authentication, the token is coded to distribute back to the system. The system may then allow user or merchant access to resource holdings associated with the user for distribution to the merchant without additional user authentication.

20 Claims, 6 Drawing Sheets

(56) References Cited

U.S. PATENT DOCUMENTS

| | | |
|---|---|---|
| 8,522,039 B2 | 8/2013 | Hyndman et al. |
| 8,572,391 B2 | 10/2013 | Golan et al. |
| 8,595,491 B2 | 11/2013 | Nice et al. |
| 8,635,157 B2 | 1/2014 | Smith et al. |
| 8,713,684 B2 | 4/2014 | Bettini et al. |
| 8,782,792 B1 | 7/2014 | Bodke |
| 8,819,772 B2 | 8/2014 | Bettini et al. |
| 8,844,038 B2 | 9/2014 | Niemelä |
| 8,863,279 B2 | 10/2014 | McDougal et al. |
| 8,904,525 B1 | 12/2014 | Hodgman et al. |
| 9,058,607 B2 | 6/2015 | Ganti et al. |
| 9,064,115 B2 | 6/2015 | Tuvell et al. |
| 9,069,957 B2 | 6/2015 | Tuvell et al. |
| 9,104,871 B2 | 8/2015 | Tuvell et al. |
| 9,143,529 B2 | 9/2015 | Qureshi et al. |
| 2006/0021003 A1 | 1/2006 | Fisher et al. |
| 2006/0123465 A1 | 6/2006 | Ziegler |
| 2010/0051685 A1 | 3/2010 | Royyuru et al. |
| 2010/0125495 A1 | 5/2010 | Smith et al. |
| 2012/0197740 A1 | 8/2012 | Grigg et al. |
| 2012/0265631 A1 | 10/2012 | Cronic et al. |
| 2013/0226800 A1 | 8/2013 | Patel et al. |
| 2013/0275303 A1 | 10/2013 | Fiore et al. |
| 2013/0282588 A1 | 10/2013 | Hruska |
| 2014/0372308 A1 | 12/2014 | Sheets |

SYSTEM FOR AUTHORIZING ACCESS BASED ON AUTHENTICATION VIA SEPARATE CHANNEL

BACKGROUND

Advancements in technology have made mobile devices with multi-faceted functionality available to large numbers of individuals. With the continued addition of new functions to these mobile devices, more and more requirements for authentication of individuals is being required. These authentications are generally utilized for protection of the user and/or the user's device.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for authorizing access based on authentication via separate channel authentication. In this way, the invention utilizes tokenized identification of user authentication into third party systems to confirm the user identification and subsequently allow authentication into an application based on receipt of the token.

In some embodiments, the invention creates a three way communication linkage for transaction completion between a merchant, a user, and a financial institution which leverages the user's authentication via the merchant system. As such, the system creates and sets up a tokenized system with the merchant and user for the sharing of information and transaction data across the token. When the user is shopping with the merchant and decides to purchase a product via a secure line or the user logs into an account with the merchant, such as a merchant loyalty account, online merchant authentication, or the like the merchant may transmit the generated token to the financial institution to complete the transaction. The financial institution utilized the fact that the user has already authenticated via the merchant to complete the transaction.

In other embodiments, the system may identify other authentication of the user and transmit a generated token associated with the user authentication to the financial institution to allow completion of a transaction using a financial institution resource. In this way, the system may identify the user network as being his/her home network when shopping online at a merchant. This may trigger a token being generated, allowing authentication and use of resources at the financial institution to complete the transaction without additional user authentication. In some embodiments, the system may identify the user as authenticated onto one or more social networking cites and generate a token allowing authentication and use of resources at the financial institution to complete the transaction without additional user authentication.

Embodiments of the invention relate to systems, methods, and computer program products for authorizing resource access and transfer based on separate channel authentication, the invention comprising: generating token including allowing for code implementation by token receiver, wherein the token includes code for automatic translation back upon code implementation by token receiver; pushing the generated token to the token receiver, wherein the token receiver is a merchant, a user, or a third party host of an authentication required program; allowing the token receiver to input code into the generated token identifying the user authenticating into an authentication required program; receiving, automatically based on the input of code into the generated token, the token including user authentication information for authenticating into the authentication required program; evaluating the user authentication information stored on the token to generate a confidence of the user identification; creating a communication linkage between a merchant, the user, and a resource managing institution for communication of resource information independent of user authentication; and allowing completion of resource transfer without additional authentication from the user, wherein the token including the user authentication information for authenticating into the authentication required program acts as authentication for resource transfer.

In some embodiments, the invention further comprises receiving an indication of a transaction between the merchant and the user based on communication from the merchant or the user, wherein receiving the indication of the transaction triggers the evaluating of the user authentication information stored on the token.

In some embodiments, the evaluating the user authentication information stored on the token to generate a confidence of the user identification further comprises determining a duration of time between the received token and an initiation of a transaction, a level of authentication provided from the user to the authentication required program, and a network location of the user at the time of the authentication into the authentication required program.

In some embodiments, the authentication required program further comprises authentication into a merchant environment, a user network, or a third party application, wherein the merchant environment is a merchant controlled portal, wherein the user network is a user home internet network, and wherein the third party applications include authorization into an e-mail or social media account of the user.

In some embodiments, upon a negative confidence of the evaluation of the user authentication information stored on the token, present to the merchant a requirement for a soft authentication by the user to complete a transaction.

In some embodiments, the authentication required program is not associated with the resource managing institution or with resource access.

In some embodiments, generating the token including allowing for code implementation by the token receiver, which includes input of user information, user authentication into the authentication required program, and the authentication required program, wherein the token is coded with program code for routing the token back to a generator of the token upon code implementation by the token receiver.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
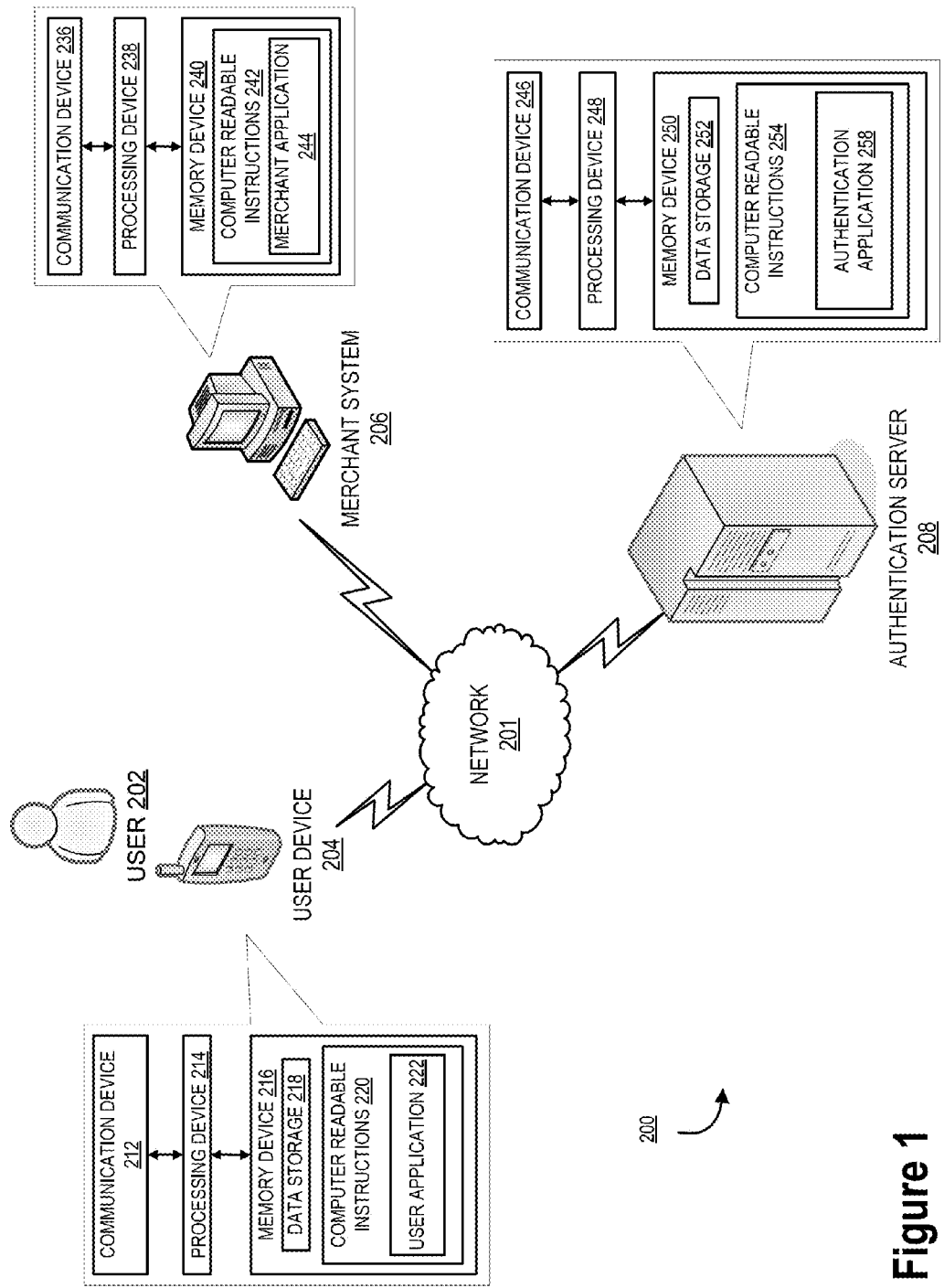
Figure 2:
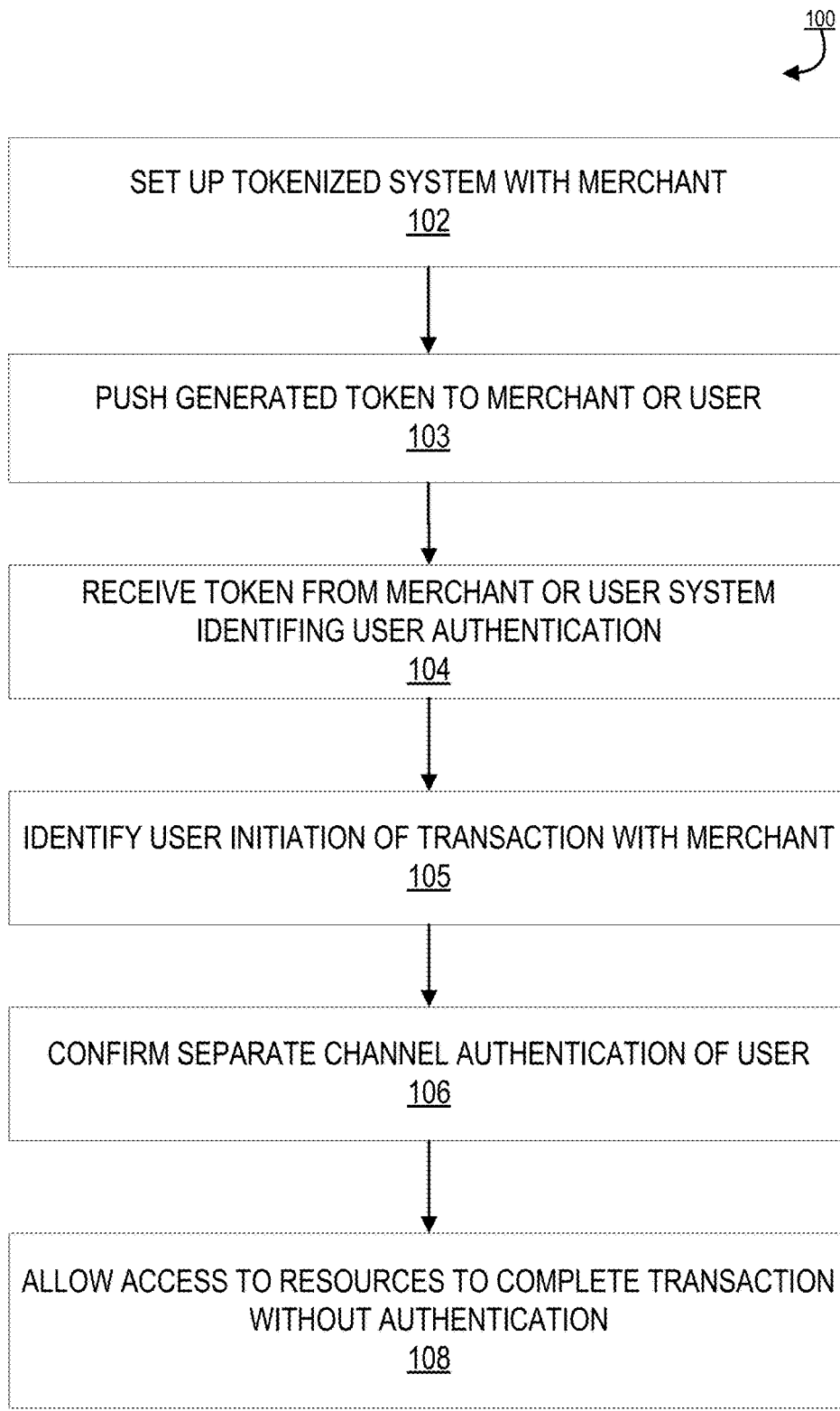
Figure 3:
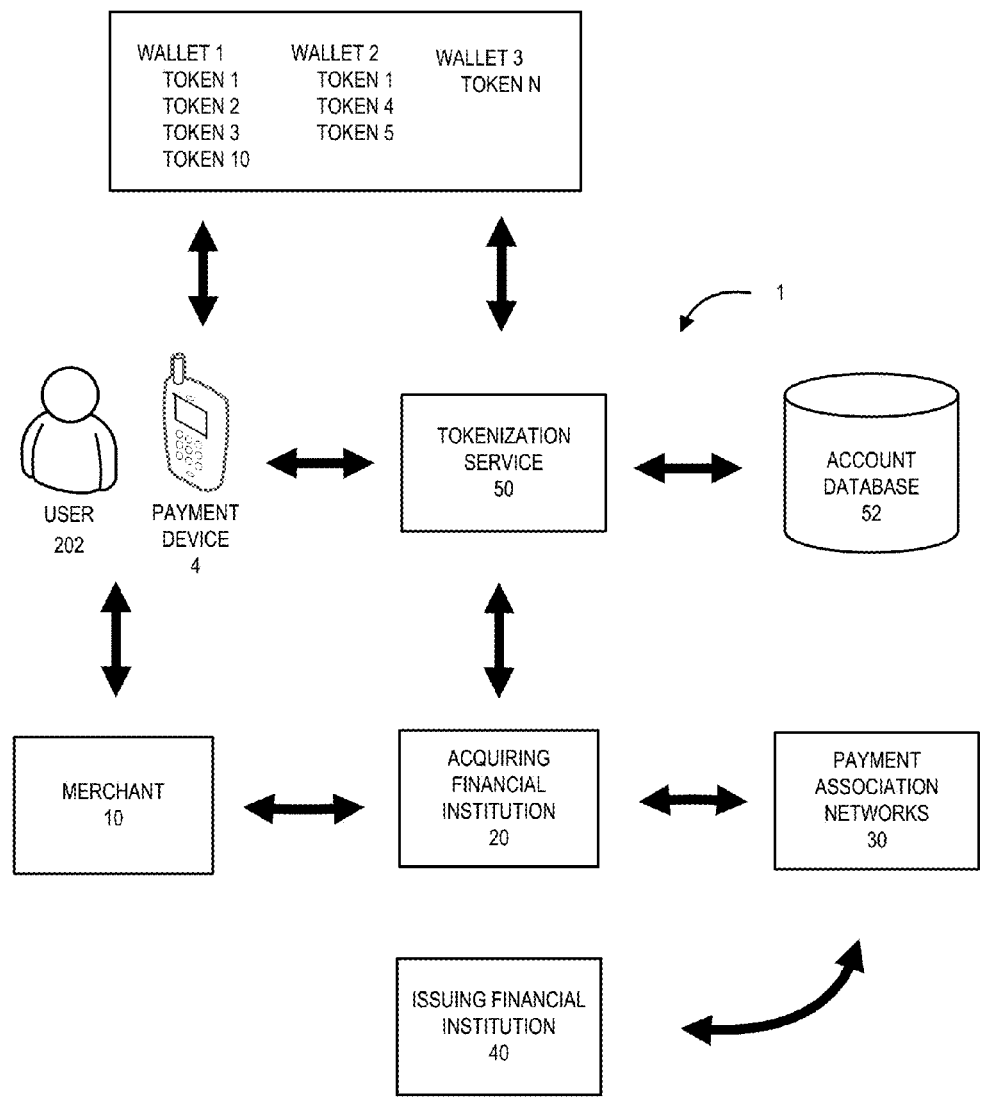
Figure 4:
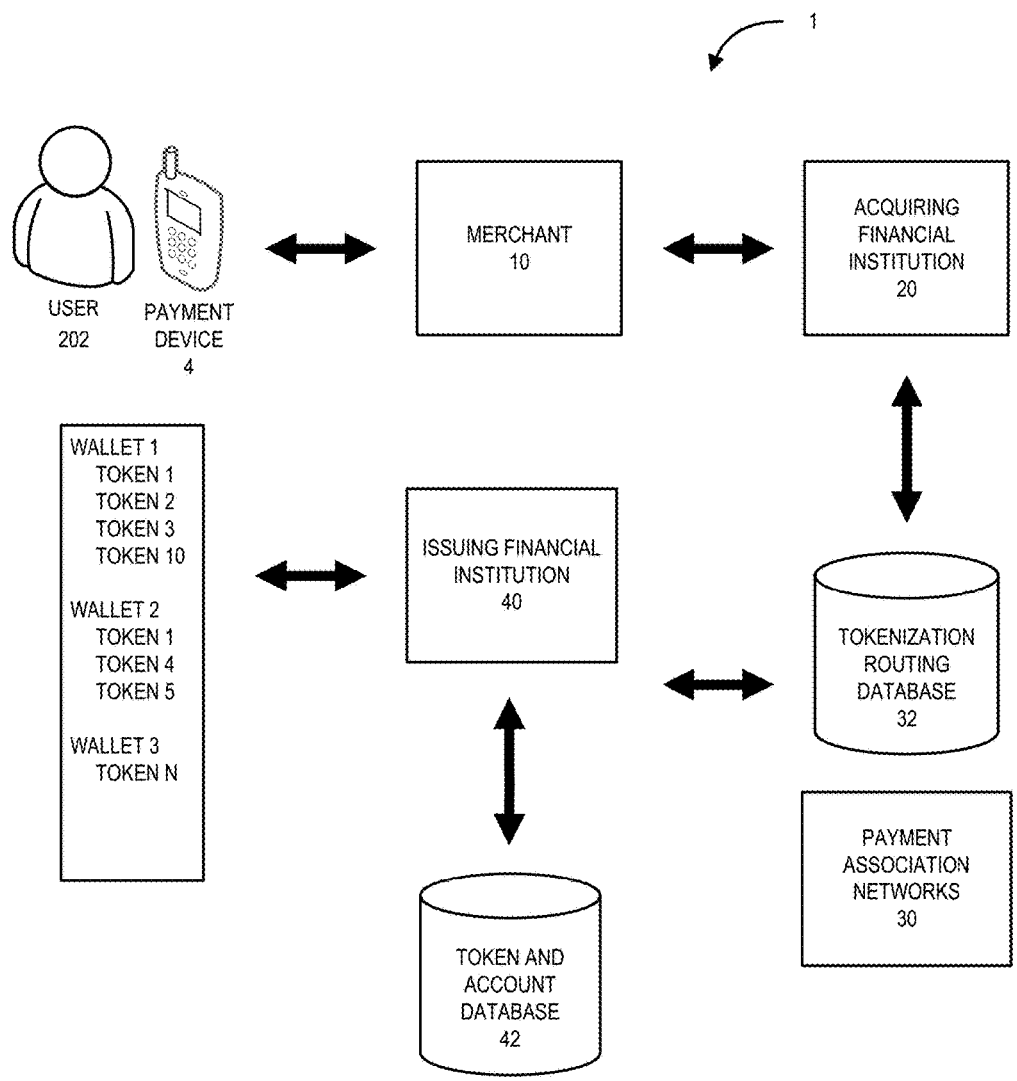
Figure 5:
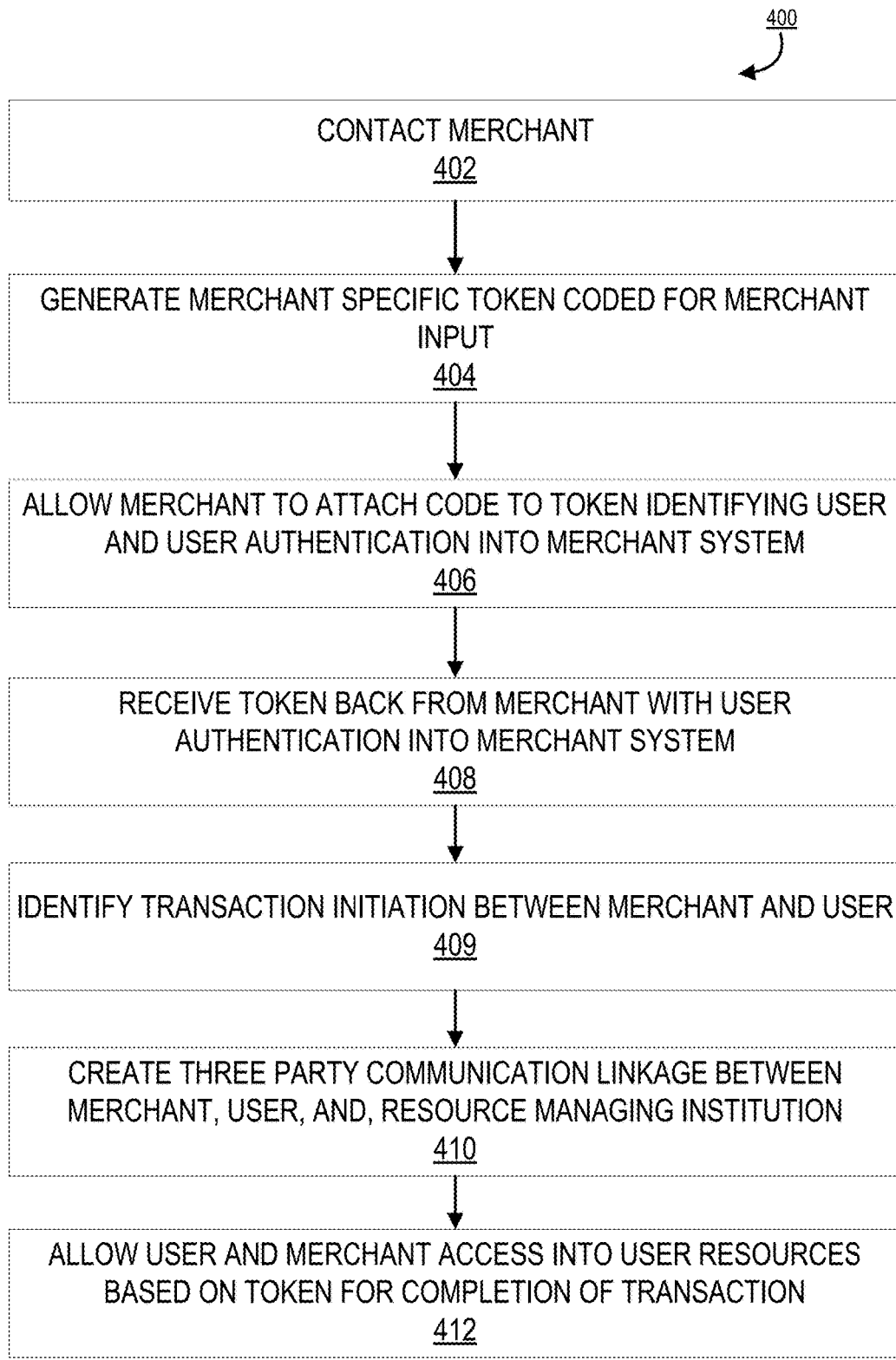
Figure 6:
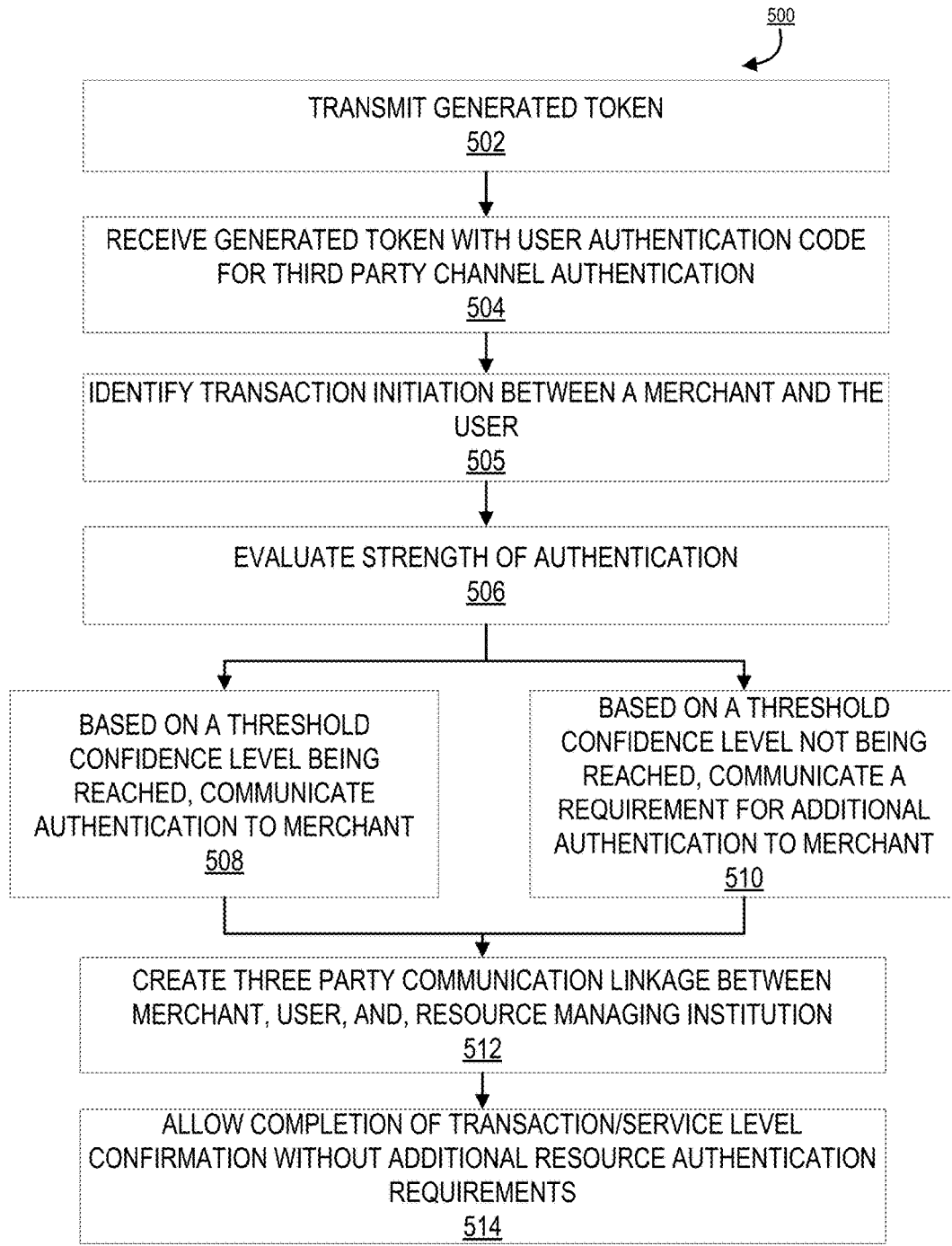

Having thus described embodiments of the invention in general terms, reference will now be made to the accompanying drawings, wherein:

FIG. 1 provides a separate channel authentication tokenization system environment, in accordance with one embodiment of the present invention;

FIG. 2 provides a high level process flow illustrating the separate channel authentication process, in accordance with one embodiment of the present invention;

FIG. 3 provides a process map illustrating tokenization generation and processing, in accordance with one embodiment of the present invention;

FIG. 4 provides a process map illustrating tokenization generation and processing, in accordance with one embodiment of the present invention;

FIG. 5 provides a process map illustrating generating and implementing a token for separate channel authentication at a merchant, in accordance with one embodiment of the present invention; and FIG. 6 provides a process map illustrating generating and implementing a token for separate channel authentication, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

As described herein, the invention may identify a user for a transaction and/or payment vehicle based on user authorization into a separate channel. This separate channel may be described as a third party portal, e-mail account, merchant account, website, or the like throughout this disclosure. One of ordinary skill in the art will appreciate that any medium requiring the user to authenticate prior to having access to some data is an acceptable medium for the token to extract authorization information from and utilize that authentication information, from the separate channel authentication for authentication for the payment vehicle and extraction of resources for completion of the transaction.

With advancements in technology infrastructures and wireless communication implementation, multi-function computer devices, such as laptop computers, tablet computers, mobile phones, and the like are common. Typically, individuals may have a user device on them when in public and/or utilize these devices to complete transactions with merchants in an online environment. These online environments typically require or desire a user to log in and authenticate themselves at the merchant online environment in order to complete the transaction from the merchant stand point.

Furthermore, the user may be required to present authentication to the merchant or financial institution to provide resources to the merchant to complete the transaction. However, this invention allows the financial institution to piggy back off of the user authentication at the merchant online environment to establish authentication of the user for access to accounts for completion of the transaction. As such, minimizing authentication requirements for a user and creating an improved shopping experience for the user and the merchant by streamlining the process of merchant to financial institution communications for resource transferring.

Tokenization as a security strategy lies in the ability to replace a real card number with a token number and the subsequent limitations placed on the token number. If the token number can be used in an unlimited fashion or even in a broadly applicable manner, the token value gains as much value as the real credit card number. In these cases, the token may be secured by a second dynamic token that is unique for each transaction and also associated to a specific payment card. Examples of dynamic, transaction-specific tokens include cryptograms used in the EMV specification, and DDM mobile payment transactions.

Embodiments of the invention are directed to a system, method, or computer program product for a token generating and provisioning system with specialized data feeds associated with the distributive network, specific triggering events associated with the data feeds, and data transformation throughout the data feeds to allow for user authentication.

FIG. 1 illustrates a separate channel authentication tokenization system environment, in accordance with one embodiment of the present invention 200, in accordance with one embodiment of the present invention. FIG. 1 provides the system environment 200 for which the distributive network system with specialized data feeds associated with the distributive network and specific triggering events associated with the data feeds for separate channel authentication tokenization.

FIG. 1 provides a unique system that includes specialized servers and system communicably linked across a distributive network of nodes required to perform the functions of identifying the user authentication at the merchant online environment to establish authentication of the user for access to accounts for completion of the transaction. As such, minimizing authentication requirements for a user and creating an improved shopping experience for the user and the merchant by streamlining the process of merchant to financial institution communications for resource transferring. Furthermore, in some embodiments, the system may be, as described below, run on a diffusion network of specialized nodes meant for the authentication tokenization system.

As illustrated in FIG. 1, the authentication server 208 is operatively coupled, via a network 201 to the user device 204, and to the merchant system 206. In this way, the authentication server 208 can send information to and receive information from the user device 204 and the merchant system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a user device 204, such as a mobile phone, tablet, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that allows a user 202 to interact through the network 201 with the authentication server 208 to request an identifier, authorize the storage of the identifier on the user device 204, and to activate the identifier. The processing device 214 is operatively coupled to the communication device 212 and the memory device 216. The processing device 214 uses the communication device 212 to communicate with the network 201 and other devices on the network 201, such as, but not limited to the merchant system 206 and the authentication server 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

In some embodiments, the user application 222 allows a user 202 to activate and utilize applications via the user device 204. Furthermore, the user application 222 allows the user to sign onto or authenticate into one or more applications or programs associated with the merchant, e-mail, financial institution, game, or other program. In this way, the user application 222 may allow the user to accept and log into any web based security requirement page on the user device 204 associated with the user 204. Furthermore, the user application 222 allows a user to input security authentications at the user device 204 to allow activation of the applications.

As further illustrated in FIG. 1, the authentication server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 206 and the user device 204. As such, the communication device 246 generally comprises a modem, server, or other device for communicating with other devices on the network 201.

As further illustrated in FIG. 1, the authentication server 208 comprises computer-readable instructions 254 stored in the memory device 250, which in one embodiment includes the computer-readable instructions 254 of an authentication application 258. In some embodiments, the memory device 250 includes data storage 252 for storing data related to the system environment, but not limited to data created and/or used by the authentication application 258.

In the embodiment illustrated in FIG. 1 and described throughout much of this specification, the authentication application 258 may generate and distribute tokens, receive coded tokens, determine authentication confidence associated with received tokens, and initiate communication linkage for completion of a transaction.

In some embodiments, the authentication application 258 may create tokens with a location for merchant or third party coding. Furthermore, the authentication application 258 may further include code for routing the token, when used at a merchant to the authentication server 208 for processing.

In some embodiments, the authentication application 258 may provide the user device 204 with the token. As such, the token may be stored in the memory 216 of the user device 204 and subsequently translated back to the authentication application 258 upon user 202 authentication into an authentication channel. In some embodiments, the authentication application 258 may provide the token to a merchant. The merchant may recognize a user authentication into an authentication channel and subsequently translate the token with the authentication information back to the authentication application 258. In other embodiments, the authentication application 258 may provide a third party with the token for coding.

In some embodiments, the authentication application 258 may receive coded tokens. The tokens are coded by a merchant system 206, user device 204, or third party system and comprise user 202 authentication credentials for the user 202 that logged into an authentication required program either using a user device 202 or at a merchant location within a predetermined time frame. Once this authentication occurs, the token is coded and the authentication application 258 may store the identified authentication information for the user 202. The stored identified authentication information includes the information about the user 202, the program authenticated into, and additional information confirming that the user is the individual authenticating into the program.

In some embodiments, once the token has been received back to the authentication application 258, the authentication application 258 may receive an indication that the user 202 is initiating a transaction with a merchant. The indication may be provided to the authentication application 258 via the network 201 from the user device 204 and/or the merchant system 206.

In some embodiments, the authentication application 258 may determine an authentication confidence associated with received tokens. In this way, the confidence may be based on the strength of the authentication required program that the user 202 gained access to. For example, if the user was previously signed into the program and did not input a password or the like to access the program, the authentication application 258 may determine that the authentication is a weak authentication. However, if the user 202 was required to input a password, or the like the authentication application 258 may determine that to be acceptable as authentication for the user 202.

In some embodiments, the authentication application 258 may initiate communication linkage for completion of a transaction. As such, the authentication application 258 may allow for incompatible merchant system 206 to communicate to a financial institution, and a user device 204 in order to receive payment for the transaction directly from the financial institution or resource manager without requiring additional authentication of the user 202 to complete the transaction.

As illustrated in FIG. 1, the merchant system 206 is connected to the authentication server 208 and is associated with a mobile device network. In this way, while only one merchant system 206 is illustrated in FIG. 1, it is understood that multiple network systems may make up the system environment 200. The merchant system 206 generally comprises a communication device 236, a processing device 238, and a memory device 240. The merchant system 206 comprises computer-readable instructions 242 stored in the memory device 240, which in one embodiment includes the computer-readable instructions 242 of a merchant application 244.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high level process flow illustrating the passive based security escalation process 100, in accordance with one embodiment of the present invention. As illustrated in block 102, the process 100 is initiated by setting up a tokenized system with the merchant. In this way, the system may generate a token system that generates tokens for identifying user authentication into a third party authentication required program. In this way, a user may log into a merchant account, add products to an online cart or bucket, enroll in a merchant rewards program, or the like. The system may generate tokens that identify the authentication and confirm authentication of a user into the authentication required programs.

As illustrated in block 103, the generated tokens to identify user authentication may be pushed to a merchant system or user system and stored there until identification of authentication into a third party authentication required program.

Once the system sends the tokens to the merchant and/or user and stores them, the tokens are triggered by identification of the user logging into an authentication required program either using a user device or at a merchant location. Once this authentication occurs, the token is triggered to store the identified authentication information for the user and be pushed back to the system. The stored identified authentication information includes the user, the program authenticated into, and additional information confirming that the user is the individual authenticating into the program. As illustrated in block 104, the process 100 continues by receiving the triggered token from the merchant or user identifying the user as authenticating into a program.

As illustrated in block 105, the system may identify in initiation of a transaction between the merchant and the user. This identification may be communicated from the merchant, such as an indication that a user is approaching a point of sale terminal at a merchant location or initiating check out during an online transaction session. In other embodiments, the system may identify the location of the user's device relative to point of sale terminals at the merchant location to identify a proximate location of the user to the merchant point of sale. In other embodiments, the user may provide an indication to the system that a transaction may be initiated.

Next, as illustrated in block 106, the process 100 continues by confirming the separate channel authentication into the authentication required program by the user. As such, the system confirms that the user authenticated into the authentication required programs via a separate third party channel. As such, the token may identify the channel, the party associated with the program, the level of authentication required for the program, the user, and the like. The separate channel and authentication required programs may include one or more merchant program, social network, e-mail network, financial institution log in, or any other channel requiring authentication to access.

Finally, as illustrated in block 108, the process 100 is completed by allowing the user or merchant to access resources to complete the transaction without requiring authentication for accessing the resources. As such, the authentication for the third party authentication required program that the user has logged into that was identified and extracted via the token may be satisfactory for accessing resources for completing the transaction.

FIG. 3 illustrates a process map of tokenization generation and processing 1, in accordance with one embodiment of the present invention. The present invention relates to tokenization, which is generally described in the area of financial transactions as utilizing a "token" (e.g., an alias, substitute, surrogate, or other like identifier) as a replacement for sensitive account information, and in particular account numbers. In the embodiments disclosed herein, the token is used to replace sensitive authorization information for a user to authenticate into one or more accounts, portals, merchant websites, or the like. As such, tokens or portions of tokens may be used as a stand in for a user account number, user name, pin number, routing information related to the financial institution associated with the account, security code, authorization codes, passwords, or other like information relating to user account login. The one or more tokens may also be utilized as a payment instrument to complete a transaction. The one or more tokens may be associated with one or more payment devices directly, or within one or more digital wallets associated with the payment devices. In other embodiments, the tokens may be associated with electronic transactions that are made over the Internet instead of using a physical payment device. Utilizing a token as a payment instrument instead of actual account information, and specifically an account number improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token and the authentications identified and stored on the tokens. Single-use tokens may be utilized once, and thereafter disappear or are erased, while multi-use tokens may be utilized more than once before they disappear or are erased.

Tokens may be 16-digit numbers like credit, debit, or other like account numbers, may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant and a user. In some embodiments, the tokens may be a username and password associated with the user for accessing one or more accounts, portals, or the like. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings the like).

In some embodiments, the tokens may be used to authorize access based on authentication via separate channel authentication. In this way, tokens may be generated and identify the user authentication into a third party system, merchant system, portal, social network, or the like. The token may store the user authentication and use it to confirm the user identification and subsequently allow authentication into an application for resource transfer based on receipt of the token that includes the user authentication into the third party system.

In some embodiments, the invention creates a three way communication linkage for transaction completion between a merchant, a user, and a financial institution which leverages the user's authentication via the merchant system. As such, the token may retrieve the user authentication information and present it to the system. The system may use the authentication information, from the third party system, as authentication for access to one or more resources for completing a transaction. As such, the system may identify other authentication of the user and transmit a generated token associated with the user authentication to the financial institution to allow completion of a transaction using a financial institution resource.

Alternatively, tokens may be generally used in a digital wallet environment. A user may have one or more digital wallets on the user's payment device. The digital wallets may be associated specifically with the user's financial institution or associated with a specific merchant, group of merchants, or other third parties. The user may associate one or more user accounts (e.g., from the same institution or from multiple institutions) with the one or more digital wallets. Instead of the digital wallet storing the specific account number associated with the user account, the digital wallet may receive a token with authentication into the third party portal and store a token or allow access to a token in order to represent the user account information (e.g., account number, user name, pin number, or the like). The digital wallet may store some or all of the user account information, including the user account number, but presents the one or more tokens instead of the user account information when entering into a transaction with a merchant. The merchant may be a business, a person that is selling a good or service (hereinafter "product"), or any other institution or individual with which the user is entering into a transaction.

Specific tokens, in some embodiments, may be tied to a single user account, but in other embodiments, may be tied to multiple user accounts, as will be described throughout this application. Moreover, the tokens may be associated with a specific digital wallet or multiple digital wallets based on the institutions and accounts with which the tokens may be associated. Moreover, the tokens themselves, or the user accounts, users, digital wallets, or the like associated with the tokens may have limitations that limit the transactions that the users may enter into using the tokens. The limitations may include, limiting the transactions of the user to a single merchant, a group of multiple merchants, merchant categories, single products, a group a products, product categories, transaction amount limits, transaction numbers, geographic locations, or other like limits as is described herein.

FIGS. 3 through 4 illustrate a number of different ways that the user 202 may use one or more tokens in order to enter into a transaction and make payments associated with the transaction. FIG. 3, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 3, a user 202 may utilize a payment device 4 (or in other embodiments a payment instrument over the Internet) to enter into a transaction without authentication. FIG. 3 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like). As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument may be used to enter into the transaction. The payment instrument may be a credit card, digital wallet associated with the payment device 4, or the like. For example, the token or digital wallet may be associated with an application that can be used regardless the device being used to enter into the transaction over the Internet.

The token is coded for identifying a user authentication into an account, a third party system, such as a social networking site, a merchant portal, e-mail account, or the like. For example, the token may be stored on one or more payment devices 4 directly, and as such any time an authentication is entered into by the user 202 prior to a pending transaction, the token may store the authentication and be pushed automatically out to the system for payment for the pending transaction. In this way, the token acts as authentication and allows the system to enter into a transaction using a payment account without the user having to provide the payment account or payment account authentication to the merchant.

The user may select a digital wallet or account within the digital wallet in order to enter into a transaction using a specific type of user account. As such, the digital wallets may be associated with the user's issuing financial institutions 40, other financial institutions, merchants 10 with which the user enters into transactions, or a third party institutions that facilitates transactions between users 202 and merchants 10.

As illustrated in FIG. 3, a tokenization service 50 may be available for the user 202 authentication for the transactions. As such, before entering into a transaction, the tokenization service 50 may identify a user authentication and store the authentication in a token. The token may be transmitted to the tokenization service 50 to confirm user authentication for the transaction. In response to the authentication the tokenization service 50 may provide payment account information to the user and stores an association with an account in the account database 52.

The token may be stored in the user's payment device 4, stored at the merchant 10, or stored on the cloud or other service through the tokenization service 50. The tokenization service 50 may also store limits (e.g., geographic limits, transaction amount limits, merchant limits, product limits, or the like) associated with the token that may limit the transactions in which the user 202 may enter. The limits may be placed on the token by the user 202, or another entity (e.g., person, company, or the like) responsible for the transactions entered into by the user 202 using a payment account. The generation of the token may prior to the transaction and stored with the user 202, merchant 10, or cloud. In some embodiments, the token may be a one-time use token or multi-use token.

After creation and communication of the token with user 202 authentication into a third party account, the user 202 may enters into a transaction with a merchant 10 using the payment device 4 (or payment instrument over the Internet). In some embodiments the user 202 may use the payment device 4 by itself, or specifically select a digital wallet or user account stored within the digital wallet, to use in order to enter into the transaction. The token will provide the authentication for the payment device, digital wallet, or user account within the wallet that may be presented to the merchant 10 as payment in lieu of the actual user account number and/or other user account information. In some embodiments, the token 10 may include the payment information and the user may not need to present any form of payment, as the token may act as authentication and payment for the transaction.

The merchant 10 receives the token, multiple tokens, and/or additional user account information for the transaction. The merchant 10 may or may not know that the token being presented for the transaction is a substitute for user authentication for the transaction, a user account number, and/or other user account information. The merchant also captures transaction information (e.g., merchant, merchant location, transaction amount, product, or the like) related to the transaction in which the user 202 is entering with the merchant 10.

The merchant 10 is thus not required to submit the user account information and the transaction information for authorization along the normal processing channels (also described as processing rails), which are normally used to process a transaction made by the user 202 using a user account number since the token provides the authentication for the transaction and payment time processing via the processing rails. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described is when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the transaction is allowed), then the acquiring financial institution 20 thereafter sends the user account number, the other user information, and the transaction information directly to the issuing financial institution 40, or otherwise indirectly through the card association networks 30. The financial institution determines if the user 202 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 202 is completed. After the transaction is completed the token may be deleted, erased, or the like if it is a single-use token, or stored for further use if it is a multi-use token.

The embodiment illustrated in FIG. 3 prevents the user account number and other user information from being presented to the merchant 10; however, the tokenization service 50, acquiring financial institution 20, the card association networks 30, and the issuing financial institution 40 all utilize the actual user account number and other user information to complete the transaction.

FIG. 4 illustrates another embodiment of a token system 1, in which the user 202 may utilize a payment device 4 (or payment instrument over the Internet) to enter into transactions with merchants 10 utilizing tokens as authentication for a subsequent payment. As illustrated in FIG. 4, the user may have one or more tokens, which may be associated with various payment device 4 once triggered based on identifying authentication into a third party account or other authentication required website. The one or more tokens may be stored in the user's payment device 4 (or on the digital wallet), merchant system, or stored on a cloud or other service through the issuing financial institution 40 or another institution. Authentication for the user 202 may be provided based on a user 202 accessing an authorization required program such as an e-mail, social network, merchant portal, or the like prior to the transaction. This authentication is stored in the token and communicated to the issuing financial institution 40 (e.g., the user's financial institution) for payment device authentication, either for the device itself, or for one or more digital wallets or one or more user accounts stored on the payment device. As previously discussed, a wallet may be specifically associated with a particular merchant (e.g., received from the merchant 10) and include one or more payment devices provided by the issuing financial institution 40 directly (or through the merchant as described with respect to FIG. 4). In other embodiments, the issuing financial institution 40 may create the digital wallet for the user 202 (e.g., for through a wallet created for a business client or retail client associated with the user 202) and include one or more payment devices for various types of transactions, products, or the like. The issuing financial institution 40 may store the tokens, the associated user account information (e.g., including the user account number), and any limits on the use of the token, as was previously described with respect to the tokenization service 50.

The user 202 may enter into a transaction with the merchant 10 using a payment device 4 (or a payment instrument through the Internet). In one embodiment the user 202 may enter into the transaction with the payment device 4 itself (or a payment instrument through the Internet). In other embodiments, a specific digital wallet and/or a specific account within the digital wallet may be selected for a particular merchant with whom the user 202 wants to enter into a transaction. For example, the user 202 may select "wallet 1" to enter into a transaction with "merchant 1" and "token 1" to utilize a specific account. The merchant 10 then identifies the user 202 based on receipt of the token that includes information about the user 202 and his/her previous authentication, thus authenticating the user for the payment device 4 selected. The merchant may then complete the transaction by providing the transaction information and authentication token to the acquiring financial institution 20. If the token has routing information the acquiring financial institution 20 may route the token and transaction data to the issuing financial institution 40 directly or through the card association networks 30. In some embodiments, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with tokens and the corresponding issuing financial institutions 40 to which transactions associated with the tokens should be routed.

Once the token and transaction details are routed to the issuing financial institution 40, the issuing financial institution 20 determines the user account and authorizes the account based on the authorization received in the token through the use of the token account database 42. The financial institution determines if the funds are available in the user account for the transaction and if the transaction information meets other limits by comparing the transaction information with the limits associated with the token or the user account. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 4 allows the user and the financial institution to shield the user's account number and other user information from all of the entities in the payment processing system because the merchant 10, acquiring merchant bank 20, payment association networks 30, or other institutions in the payment processing system only used the token for authorization and/or other shielded user information to process the transaction. Only the issuing financial institution 40 has the actual account number of the user 202.

The embodiments of the invention illustrated in FIGS. 3 through 4 are only example embodiments of the invention, and as such it should be understood that combinations of these embodiments, or other embodiments not specifically described herein may be utilized in order to process transactions between a user 202 and merchant 10 using one or more tokens as a substitute for user account authentication such that the merchant, or even other institutions in the payment processing system do not have access to the actual user authentication, user accounts, or account information.

As briefly discussed above, if the issuing financial institution 40 creates the digital wallet not only does the financial institution 40 receive transaction information along the normal processing channels, but the financial institution 50 may also receive additional transaction information from the user 202 through the digital wallet using the application program interfaces (APIs) or other application created for the digital wallet. For example, geographic location information of the user 202, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 202, the issuing financial institution 40 may not receive all the transaction information from the traditional transaction processing channels or from the digital wallet. As such, the issuing financial institution 40 may have to receive additional transaction information from another application associated with the user 202 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the user enters into transactions using the digital wallets.

Moreover, when there is communication between the digital wallets of the users 202 and the issuing financial institution 40 or another institution, transactions in which the user 202 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 3 through 4.

FIG. 5 illustrates a process map for generating and implementing a token for separate channel authentication at a merchant 400, in accordance with one embodiment of the present invention. As illustrated in block 402, the process 400 is initiated by the system communicating with and contacting a merchant. As such, in this embodiment, the token is directed to the merchant for merchant identification of the user accessing the merchant system. For example, the user may log onto an account on a website of the merchant, a loyalty account of the merchant, or the like. The authentication of the user into the merchant account may be identified, incorporated into a token and used as authentication into a payment device and payment processing for a subsequent transaction.

Next, as illustrated in block 404, the process 400 continues by generating a merchant specific token coded for merchant input. In this way, the token may be generated specifically for the merchant to store. The token may be coded such that the merchant may input user authentication information into the token once the authentication has been identified. As such, the tokens are generated with specific programing and coding for merchant reading and allowance of the merchant to interject code into the generated token.

As illustrated in block 406, the system then allows the merchant to attach code to the token. The attached code identifies the user and user authentication into the merchant system. In this way, the system may provide the merchant with tokens for coding. The merchant may store the tokens in a merchant system until identification of a user attempting to access the merchant system via authentication. This authentication may be for access to a shopping cart, loyalty account, merchant portal, or the like. The authentication may be a username and password, a PIN number, email address and password, biometric scan, or any combination of requirements for authentication.

Once the merchant has identified the user authentication into the merchant system, the merchant may code the token with the user authentication information. Next, as illustrated in block 408, the process continues by receiving the coded token back from the merchant with the user authentication information for the merchant system. The received token is the analyzed to confirm the identity of the user accessing the merchant system.

As illustrated in block 409, the system may receive an indication from the user or from the merchant that the user has initiated a transaction with the merchant. Upon confirmation of the user authentication from the received token and the indication of the initiated transaction between the merchant and the user, the system, as illustrated in block 410 creates a three party communication linkage between the merchant, user, and resource managing institution for the resource managing institution to provide a payment vehicle and authorization to the merchant without the user having to provide personal information to the merchant.

Finally, as illustrated in block 412, the process 400 is completed by allowing the user and the merchant to access user resources based on the token authentication for completion of the transaction between the user and the merchant.

FIG. 6 illustrates generating and implementing a token for separate channel authentication 500, in accordance with one embodiment of the present invention. As illustrated in block 502, the process 500 is initiated by transmitting a generated token. In this way, the system may generate a token that may be coded to include user authentication into a third party channel. In this way, the token may be distributed to merchants, internet based systems, cloud computing systems, user systems, or stored internally at the system. The transmitted token may include space therein for coding of input of user authentication into a third party channel. In this way, the system or storage that receives the token may code the token with subsequently identified user authentication information for the channel associated with the system or storage that received the token. As such, for example, a user may log into an internet product provider or internet auction house. The log in of the user would be considered a third party channel authentication, since the interment product provide or internet auction house is not associated with the separate channel authentication tokenization system. The stored token may be coded with the user authentication into the separate or third party channel. This coding may trigger transfer of the token back to the separate channel authentication tokenization system.

At this point, as illustrated in block 504, the process 500 continues by receiving the generated token with user authentication code for when the user accessed the third party channel. In some embodiments, the third party channel that the user authorized may not be associated with the merchant. In some embodiments, the user authentication may be an authentication into a merchant environment, such as online shopping, loyalty program, or the like. In some embodiments, the user authentication may be an authentication into a user network such as a user home internet network or a user trusted network, such as a work network or the like. In other embodiments, the user authentication may be an authentication into or check-in via a third party application such as a social networking application or the like.

Subsequently, the system may receive an indication of a transaction initiation between a merchant and the user, as illustrated in block 505. The initiation of the transaction triggers the transmission of the token with user authentication from the third party channel to the system. In this way, the system now has an indication of a transaction initiation between the user and a merchant and a token with authentication into a separate and/or third party channel for the user.

As illustrated in block 506, the system may evaluate the strength of the authentication received via the token. The evaluation analyzes several factors about the authentication received. First, the system evaluates the duration of time between the received token and the initiation of the transaction. The closer in time that an authentication is received to the transaction, the higher confidence. This is especially true when the authentication is into a merchant portal and the transaction is occurring with that same merchant. Second, the system evaluates the required authentication level of the authentication. If the authentication is into a social media account or the like where a lower level of authentication is required to access data, the strength of the authentication may be lower than if the authentication is into a financial account or the like. Finally, the location that the authentication occurred is considered. If the authentication occurs at a user home network, a trusted network, at the merchant, or the like the system may recognize that location as a secure location and a strong authentication.

Based on the strength, a confidence level is created that determines whether additional soft authentication may be required by the user at the point of transaction or if the toke authentication satisfies payment rail requirements and the payment may be processed without any additional authentications. As illustrated in block 508, the confidence level has been has been reached and the authentication may be communicated to the merchant. As illustrated in block 510, the threshold confidence level for authentication for payment or resource distribution was not met based on the third party channel authentication, and as such, the system may communicate a requirement for an additional soft authentication to the merchant in order for the merchant to complete the transaction with the user and receive resources for the transaction. Soft authentication may be a name and corresponding identification card, email address conformation, telephone number confirmation, or the like.

Next, as illustrated in block 512, once a confidence has been determined for the authentication and/or additional soft authentication has been provided by the user to meet the authentication threshold, the process 500 continues by creating a three party communication linkage between the merchant, the user, and a resource managing institution for completion of payment for the transaction without requiring additional authentication and/or not requiring the user to provide any account information to the merchant. This communication linkage allows the resource managing institution to provide resources to the merchant for the transaction between the user and the merchant directly. This transfer does not require authentication for the user based on the received token with authorization into a third party channel. As such, the system does not require the user to access and authorize resource transfers or access the resource managing institution in order to complete the transaction.

Finally, as illustrated in block 514, the process is completed by allowing for the completion of the transaction without additional resource authentication requirements.

In some embodiments, the transaction as described herein may refer to one or more services. As such, based on the authentication of a user from a third party, a service may be provided to the user. In other embodiments, based on the authentication, a lesser requirement of questions for a misappropriation service or the like may be required. In this way, based on the authentication a misappropriation service may limit the push of misappropriation authentication questions to the user.

As such, the system provides a two way dialog for transaction and service completion based on separate or third party authentication. In this way, the system may determine a level of support or level or additional authentications required based on the confidence that the user is authenticated.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/987,754 | SYSTEM FOR REMOTELY CONTROLLING ACCESS TO A MOBILE DEVICE | Concurrently herewith |
| 14/987,745 | MOBILE DEVICE DATA SECURITY SYSTEM | Concurrently herewith |
| 14/987,553 | SYSTEM FOR ESCALATING SECURITY PROTOCOL REQUIREMENTS | Concurrently herewith |
| 14/987,577 | SYSTEM FOR ASSESSING NETWORK AUTHENTICATION REQUIREMENTS BASED ON SITUATIONAL INSTANCE | Concurrently herewith |

What is claimed is:

1. A system for authorizing resource access and transfer based on separate channel authentication, the system comprising:
   a memory device with computer-readable program code stored thereon;
   a communication device;
   a processing device operatively coupled to the memory device and the communication device, wherein the processing device is configured to execute the computer-readable program code to:
      generate token including allowing for code implementation by token receiver, wherein the token includes code for automatic translation back upon code implementation by token receiver;
      push the generated token to the token receiver, wherein the token receiver is a merchant host of an authentication required program;
      allow the token receiver to input code into the generated token identifying the user authenticating into an authentication required program;
      trigger transfer of the generated token from the token receiver upon code input;
      receive the generated token now including code inputted by the token receiver including user authentication information for authenticating into the authentication required program;
      evaluate the user authentication information stored on the token to generate a confidence of the user identification; and
      create a communication linkage between a merchant, the user, and a resource managing institution for communication of resource information independent of user authentication, wherein the communication linkage provides a linkage for completing the resource transfer without resource transfer authentication from the user, wherein the token that includes the user authentication information for authenticating into the authentication required program of the merchant host acts as authentication for resource transfer to the merchant.

2. The system of claim 1, further comprising receiving an indication of a transaction between the merchant and the user based on communication from the merchant or the user, wherein receiving the indication of the transaction triggers the evaluating of the user authentication information stored on the token.

3. The system of claim 1, wherein the evaluating the user authentication information stored on the token to generate a confidence of the user identification further comprises determining a duration of time between the received token and an initiation of a transaction, a level of authentication provided from the user to the authentication required program, and a network location of the user at the time of the authentication into the authentication required program.

4. The system of claim 1, wherein the authentication required program further comprises authentication into a merchant environment, a user network, or a third party application, wherein the merchant environment is a merchant controlled portal, wherein the user network is a user home interne network, and wherein the third party applications include authorization into an e-mail or social media account of the user.

5. The system of claim 1, wherein upon a negative confidence of the evaluation of the user authentication information stored on the token, present to the merchant a requirement for a soft authentication by the user to complete a transaction.

6. The system of claim 1, wherein the authentication required program is not associated with the resource managing institution or with resource access.

7. The system of claim 1, wherein generating the token including allowing for code implementation by the token receiver, which includes input of user information, user authentication into the authentication required program, and the authentication required program, wherein the token is coded with program code for routing the token back to a generator of the token upon code implementation by the token receiver.

8. A computer program product for authorizing resource access and transfer based on separate channel authentication, the computer program product comprising at least one non-transitory computer-readable medium having computer-readable program code portions embodied therein, the computer-readable program code portions comprising:

an executable portion configured for generating token including allowing for code implementation by token receiver, wherein the token includes code for automatic translation back upon code implementation by token receiver;

an executable portion configured for pushing the generated token to the token receiver, wherein the token receiver is a merchant host of an authentication required program;

an executable portion configured for allowing the token receiver to input code into the generated token identifying the user authenticating into an authentication required program;

an executable portion configured for triggering transfer of the generated token from the token receiver upon code input;

an executable portion configured for receiving, the generated token now including code inputted by the token receiver including user authentication information for authenticating into the authentication required program;

an executable portion configured for evaluating the user authentication information stored on the token to generate a confidence of the user identification; and an executable portion configured for creating a communication linkage between a merchant, the user, and a resource managing institution for communication of resource information independent of user authentication, wherein the communication linkage provides a linkage for completing the resource transfer without resource transfer authentication from the user, wherein the token that includes the user authentication information for authenticating into the authentication required program of the merchant host acts as authentication for resource transfer to the merchant.

9. The computer program product of claim 8, further comprising an executable portion configured for receiving an indication of a transaction between the merchant and the user based on communication from the merchant or the user, wherein receiving the indication of the transaction triggers the evaluating of the user authentication information stored on the token.

10. The computer program product of claim 8, wherein the evaluating the user authentication information stored on the token to generate a confidence of the user identification further comprises determining a duration of time between the received token and an initiation of a transaction, a level of authentication provided from the user to the authentication required program, and a network location of the user at the time of the authentication into the authentication required program.

11. The computer program product of claim 8, wherein the authentication required program further comprises authentication into a merchant environment, a user network, or a third party application, wherein the merchant environment is a merchant controlled portal, wherein the user network is a user home internet network, and wherein the third party applications include authorization into an e-mail or social media account of the user.

12. The computer program product of claim 8, wherein upon a negative confidence of the evaluation of the user authentication information stored on the token, present to the merchant a requirement for a soft authentication by the user to complete a transaction.

13. The computer program product of claim 8, wherein the authentication required program is not associated with the resource managing institution or with resource access.

14. The computer program product of claim 8, wherein generating the token including allowing for code implementation by the token receiver, which includes input of user information, user authentication into the authentication required program, and the authentication required program, wherein the token is coded with program code for routing the token back to a generator of the token upon code implementation by the token receiver.

15. A computer-implemented method for authorizing resource access and transfer based on separate channel authentication, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating token including allowing for code implementation by token receiver, wherein the token includes code for automatic translation back upon code implementation by token receiver;

pushing the generated token to the token receiver, wherein the token receiver is a merchant host of an authentication required program;

allowing the token receiver to input code into the generated token identifying the user authenticating into an authentication required program;

triggering transfer of the generated token from the token receiver upon code input;

receiving the generated token now including code inputted by the token receiver including user authentication information for authenticating into the authentication required program;

evaluating, via the computer processing device, the user authentication information stored on the token to generate a confidence of the user identification; and creating a communication linkage between a merchant, the user, and a resource managing institution for communication of resource information independent of user authentication, wherein the communication linkage provides a linkage for completing the resource transfer without resource transfer authentication from the user, wherein the token that includes the user authentication information for authenticating into the authentication required program of the merchant host acts as authentication for resource transfer to the merchant.

16. The computer-implemented method of claim 15, further comprising receiving an indication of a transaction between the merchant and the user based on communication from the merchant or the user, wherein receiving the indication of the transaction triggers the evaluating of the user authentication information stored on the token.

17. The computer-implemented method of claim 15, wherein the evaluating the user authentication information stored on the token to generate a confidence of the user identification further comprises determining a duration of time between the received token and an initiation of a transaction, a level of authentication provided from the user to the authentication required program, and a network location of the user at the time of the authentication into the authentication required program.

18. The computer-implemented method of claim 15, wherein the authentication required program further comprises authentication into a merchant environment, a user network, or a third party application, wherein the merchant environment is a merchant controlled portal, wherein the user network is a user home internet network, and wherein the third party applications include authorization into an e-mail or social media account of the user.

19. The computer-implemented method of claim 15, wherein upon a negative confidence of the evaluation of the user authentication information stored on the token, present to the merchant a requirement for a soft authentication by the user to complete a transaction.

20. The computer-implemented method of claim 15, wherein the authentication required program is not associated with the resource managing institution or with resource access.

\* \* \* \* \*